United States Patent [19]
Taylor, Jr. et al.

[11] Patent Number: 5,301,218
[45] Date of Patent: Apr. 5, 1994

[54] TOLERANT METAL FUEL/CLADDING BARRIER AND RELATED METHOD OF INSTALLATION

[75] Inventors: Ira N. Taylor, Jr., Livermore; Donald C. Wadekamper, Pleasanton, both of Calif.

[73] Assignee: General Electric Company, San Jose, Calif.

[21] Appl. No.: 964,995

[22] Filed: Oct. 22, 1992

[51] Int. Cl.$^5$ .............................. G21C 3/00
[52] U.S. Cl. .................... 376/417; 376/416; 376/457
[58] Field of Search .......... 376/417, 260, 416, 457, 376/415, 418; 976/DIG. 53, DIG. 43

[56] References Cited

U.S. PATENT DOCUMENTS

| | | | |
|---|---|---|---|
| 3,291,700 | 12/1966 | Brossa et al. | 376/417 |
| 3,620,691 | 11/1971 | Rubel | 376/417 |
| 3,719,560 | 3/1973 | Mayers et al. | 376/442 |
| 3,969,186 | 7/1976 | Thompson et al. | 376/418 |
| 4,022,662 | 5/1977 | Gordon et al. | 376/416 |
| 4,178,022 | 12/1979 | Hanneman | 285/286 |
| 4,372,817 | 2/1983 | Armijo et al. | 376/417 |
| 4,971,753 | 11/1990 | Taylor, Jr. et al. | 376/417 |

Primary Examiner—Donald P. Walsh
Assistant Examiner—Meena Chelliah
Attorney, Agent, or Firm—J. S. Beulick

[57] ABSTRACT

A multi-layer, rolled metal foil is laser tackwelded to form a tube which can be inserted in the intermediate space between the fuel body and cladding of a metal alloy fissionable fuel element. The rolled foil has at least three foil layers at the point of tack welding. The laser welding penetration is adjusted so that the foil weld is maintained at a thickness of at least two foil layers, but does not penetrate all of the layers. The weld is designed to fail in response to fuel or blanket alloy swelling during irradiation. After weld failure, the overlapping layers slip and the multi-layer foil unrolls as the fuel swells, providing a continuous, unbroken barrier between the fuel or blanket alloy and cladding which masks defects in the barrier due to weld failure.

20 Claims, 1 Drawing Sheet

TOLERANT METAL FUEL/CLADDING BARRIER AND RELATED METHOD OF INSTALLATION

FIELD OF THE INVENTION

This invention generally relates to fuel elements containing fissionable fuel material for use in nuclear reactors. In particular, the invention is directed to an improvement in nuclear reactor fuel elements containing fissionable fuel in metallic form and metal alloys which are housed within stainless steel containers.

BACKGROUND OF THE INVENTION

Typical fissionable nuclear fuels in metal form comprise uranium, plutonium and thorium, which can be employed alone or alloyed. The fuels currently utilized are primarily comprised of uranium metal. A preferred fuel comprises combinations of a major portion of uranium alloyed with a minor portion of plutonium, for example, 60–98 wt. % uranium metal with 2–40 wt. % plutonium metal.

Fissionable fuel materials in metallic form have a long history in the nuclear reactor field, but due to significant shortcomings, have conventionally been used primarily in the so-called breeder type of reactors utilizing liquid metal coolants. The primary drawbacks of the use of metallic fissionable material as fuel are their relatively low melting temperatures and accompanying loss of structural characteristics such as tensile strength at moderately low temperatures, and their high degree of reactivity with other elements, including susceptibility to corrosion. Uranium in metallic form (the most prevalent fissionable fuel material) melts at only 2070° F. (1132° C.), and an alloyed metal fuel containing uranium and plutonium normally has an even lower melting temperature. For example, an 88 wt. % U—12 wt. % Pu alloy has a melting temperature of about 1130° F. (610° C.).

On the other hand, fissionable fuels in metallic form provide excellent thermal conductivity for highly efficient heat transfer, and maximum concentration of fissionable atoms per unit volume. Thus, more power can be produced per unit volume with metallic fuel and heat can be transferred more efficiently to the liquid coolant.

Alloys of uranium metal and/or plutonium metal have been proposed and used to enhance metal fuels and overcome the shortcomings of metallic fuel. For example, small amounts of alloying metals such as molybdenum, niobium, titanium, zirconium, vanadium or chromium have been used to stabilize phase structures and, in turn, the properties attributable thereto in metallic fuels. For instance, the article "Properties of Uranium-Plutonium-Base Metallic Alloys" by R. J. Dunworth et al., Argonne National Laboratory, Annual Progress Report for 1965, ANL-7155 (1965), pp. 14–25, discloses the alloying of metal fuel with zirconium or titanium to increase the melting temperature of uranium-plutonium fuel.

Zirconium is also included as an alloying component in such metallic fuels to provide an elevated solidus temperature for the fuel and to enhance its chemical compatibility with stainless steel, which is commonly employed in fuel containers for service in liquid metal-cooled nuclear reactors. A preferred metal fuel alloy which has been considered for commercial service comprised an alloyed composition of 64 wt. % U—26 wt. % Pu—10 wt. % Zr. Such an alloy has a melting point of about 1868° F. (1020° C.).

However, additional problems attend the technique of alloying conventional fissionable metal fuels with non-fuel elements such as zirconium metal. It has been found that evidently due to inherent reactor conditions of intense radiation and high temperatures, metal alloy fuels which initially comprise a substantially uniform mixture of alloyed ingredients become chemically redistributed into nonuniform mixtures. This restructuring of the metal alloyed fuel has a pronounced effect upon its properties and their uniformity throughout the mass of the fuel body.

One significant aspect of this redistribution of the alloyed ingredients, such as zirconium, is the inward migration of the zirconium metal to the inner or central area of the fuel body. This is accompanied by an increase in the solidus temperature of the inner or central area and correspondingly a reduced solidus temperature in the outer or peripheral area of the unit. Thus, the melting temperature of the remaining alloy in the peripheral area of the fuel body is lowered, and the intended effect of the added zirconium to avoid low-melting phase formation is reduced or negated. A lower melting temperature of the surface portion of a fuel body increases the potential for chemical interaction with adjoining materials.

When the zirconium migrates, the remaining alloy ingredients form lower-melting-point alloys or eutectic compositions. Moreover, in the absence of zirconium, components remaining in the peripheral area of the fuel, such as plutonium and fission-produced cerium, form low-melting-point phases which can attack or react with the stainless steel of the fuel container (hereinafter "cladding"), thereby degrading the integrity of the cladding. An interaction between fuel components and the stainless steel cladding will degrade the structural strength of the relatively thin wall of the cladding due to reduced thickness, altered composition or resulting permeability.

A paper entitled "Chemical Interaction of Metallic Fuel with Austenitic and Ferritic Stainless Cladding", by G. L. Hofman et al., Argonne National Laboratory, Tucson Conference, September (1986), discussed interdiffusion phenomena between metallic fuel comprising U-Pu-Zr and components of ferritic stainless steel fuel cladding which could degrade the performance of the fuel composition. These phenomena include formation of strength-reducing diffusion zones within stainless steel, intergranular penetration of fuel ingredients into stainless steel, and formation of eutectic areas having a melting temperature below the operating temperature.

Typical liquid metal-cooled nuclear reactors conventionally use stainless steel cladding, preferably those stainless steel alloys marketed under the commercial designations HT9 or D9. Typical compositions for these stainless steel alloys are given in Table 1.

TABLE 1

| Ingredient (wt. %) | HT9 | D9 |
|---|---|---|
| Fe | 84.8 | 65.7 |
| Cr | 12.0 | 14.5 |
| Ni | 0.6 | 14.5 |
| Mo | 1.0 | 2.0 |
| Mn | 0.5 | 2.0 |
| W | 0.4 | — |
| V | 0.3 | — |
| Si | 0.2 | 1.0 |
| Ti | — | 0.3 |

TABLE 1-continued

| Ingredient (wt. %) | HT9 | D9 |
|---|---|---|
| C | 0.2 | 0.03 |
| N | 0.004 | 0.005 |
| O | 0.006 | 0.006 |

Low-melting-point metal alloys form at the interface between U-Zr or U-Pu-Zr metal alloy fuels and stainless steel cladding such as HT9 and D9 alloys. These low-melting-point alloys can seriously degrade cladding performance during high-temperature reactor transient events.

Cladding materials are selected for their resistance to interaction with U-Zr or U-Pu-Zr metal alloy fuels. Nevertheless, diffusion couple studies and irradiation evaluations have demonstrated that diffusion of plutonium, uranium and fission products to the cladding material occurs without a corresponding diffusion of enough zirconium to maintain the desired high-melting-point alloy composition at the interface of the fuel and the cladding.

Irradiation studies demonstrated that contact between HT9 cladding and 71 wt. % U—19 wt. % Pu—10 wt. % Zr metal alloy fuel resulted in a 7 to 10-μm-deep reaction zone in the steel alloy at 2.9 a/o burnup, which zone was enriched in plutonium and the radiation product cesium. Both plutonium and cesium form low-melting-point alloys with stainless steel alloy constituents as illustrated in Table 2.

TABLE 2

| Alloy | Melting Point (°C.) | Composition (wt. %) |
|---|---|---|
| Pu—Fe | 410 | 2.5 Fe |
| Pu—Ni | 475 | 4 Ni |
| Ce—Ni | 477 | 8 Ni |
| Ce—Fe | 592 | 4 Fe |
| Pu—U | 610 | 12 U |
| Pu—Mo | 613 | 0.5 Mo |
| Pu—Cr | 615 | 0.5 Cr |
| Pu—Ce | 625 | 12 Ce |
| Pu | 640 | — |
| Pu—Zr | >640 | * |
| U—Fe | 725 | 11 Fe |
| U—Ni | 740 | 11 Ni |
| Zr—Ce | 750 | 3 Zr |
| U—Cr | 860 | 5 Cr |
| U—26Pu—2Zr | 913 | — |
| Zr—Fe | 934 | 16 Fe |
| Zr—Fe | 961 | 17 Ni |
| U | 1134 | — |
| U—Zr | >1134 | * |
| Zr—Cr | 1300 | 18 Cr |

* Form solid solutions, Pu and U have lowest melting points in the system.

The nonuniform melting conditions of metal alloy fuels in reactor service and the potential effect is a subject of an article entitled "Post-Irradiation Examination of U-Pu-Zr Fuel Elements Irradiated in EBR-11 to 4.5 Atomic Percent Burnup" by W. F. Murphy et al., Argonne National Laboratory, ANL-7602, November (1969). This article additionally discusses the extensive physical changes which occur in metal alloy fuel during fission, such as extensive deformation. Such deformation includes expansion or swelling of up to about 30% by volume due to thermal effects and internal generation of fission-produced gases.

The potential for cladding failure is discussed in an article entitled "Metallic Fuel Cladding Eutectic Formation During Post-Irradiation Heating" by B. R. Seidel, Argonne National Laboratory, Trans. Ans. 34, June (1980), pp. 210 and 211.

A method of inhibiting an interaction between a metal alloy fissionable duel for a nuclear reactor and a stainless steel cladding for the fuel was disclosed in U.S. Pat. No. 4,971,753, which patent is assigned to the assigned of the present application. In accordance with that teaching, a fuel element having a body of alloyed uranium metal fuel housed within stainless steel cladding is provided with an expendable source of alloying metal which raises the melting temperature of the metallic fuel. In particular, a zirconium barrier is placed between the alloyed uranium metal fuel body and the stainless steel cladding. This barrier protects the stainless steel cladding from the deleterious effects of low-melting-point alloys resulting from irradiation by increasing the melting point of such alloys the availability of zirconium to raise the melting point of alloys formed at the fuel/cladding interface.

U.S. Pat. No. 4,971,753 states that the zirconium barrier can be installed in the fuel element in the form of a layer of zirconium formed on the outer peripheral surface of the fuel body or on the inner peripheral surface of the cladding; or in the form of a hollow cylinder, e.g., rolled zirconium metal foil or a rigid tubular section, of zirconium inserted in the space intermediate the fuel body and cladding.

The amount of barrier material between the metal fuel and the stainless steel cladding necessary to raise the interface alloy temperature to an acceptable level is in the range of 0.002 to 0.004 inch. Traditional techniques of providing a thin, high-integrity barrier material are unacceptable from the standpoint of fabrication and inspection difficulties as well as cost.

The required barrier can be provided by thin-wall tubing positioned between the metal fuel and cladding Tubing with a 0.002 to 0.004-inch wall thickness is difficult as well as expensive to fabricate. The inspection to assure the absence in the tube wall of any defects which would provide a path for fuel or blanket alloy and cladding contact is also expensive. Another problem associated with the tubing approach is the possible failure of the tube wall as the fuel swells during irradiation.

The chemical vapor deposition technique can be utilized to deposit barrier material on the inside of the cladding. However, the carrier gas is fluorine, which causes stress corrosion in stainless steels. As a result, all halogens are excluded from methods for fabricating stainless steel cladding intended for use in a nuclear reactor. The hot isostatic pressing approach wherein the barrier material is bonded to the stainless steel cladding is unacceptable because the bonding cycle may alter special heat treatments or work hardening of the cladding required to withstand irradiation effects. Although sputtering techniques can be used to deposit barrier material on the inner surface of the cladding, the small diameter and long length of the cladding severely limits use of this approach. All deposition, bonding or sputtering techniques for applying barrier metal to the inside of the cladding are relatively expensive, and inspection and verification of the barrier uniformity are difficult.

SUMMARY OF THE INVENTION

The present invention improves upon the teachings of U.S. Pat. No. 4,971,753 by providing a simple and cost-effective method for installing a barrier between stainless steel cladding and metal fuel and blanket alloys. In accordance with the method of the invention, a multi-layer, rolled metal foil is laser tack-welded to form a tube which can be inserted in the intermediate space between the fuel and cladding during a nonradioactive assembly step. The laser welding penetration is adjusted so that the foil weld is maintained at a thickness one or more layers less than the number of layers of foil in the barrier, with a minimum of two foil layers. This weld is designed to fail in response to fuel or blanket alloy swelling during irradiation. After weld failure, the overlapping layers slip and the multi-layer foil unrolls as the fuel swells, providing a continuous, unbroken barrier between the fuel or blanket alloy and cladding which masks defects in the barrier from welding or weld failure. The slippage of the individual layers in the multi-foil barrier also masks any undetected fabrication defects in the foil.

BRIEF DESCRIPTION OF THE DRAWINGS

The preferred embodiment of the invention will be described in detail with reference to the drawings, wherein.

DETAILED DESCRIPTION OF THE PREFERRED EMBODIMENTS

Figure 1:
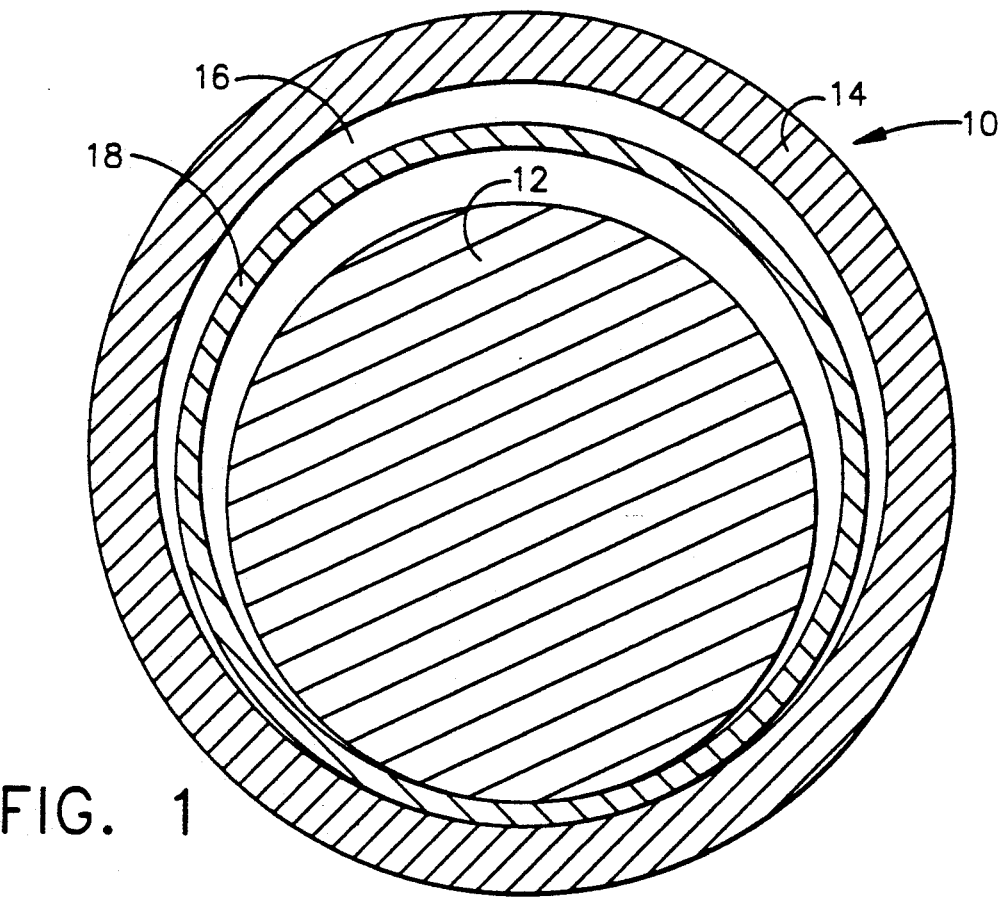
FIG. 1 is a cross-sectional view (not to scale) of a nuclear fuel element in accordance with the preferred embodiment of the invention.

Referring to FIG. 1, the fuel element or pin 10 comprises an elongated body of fuel 12, such as a rod sometimes referred to as a pin or slug, containing a fissionable material in the form of metal or metal alloy. The fuel body 12 (or several aligned fuel bodies) is housed within a sealed, tube-like metal container 14, sometimes referred to as "fuel cladding". Cladding 14 isolates the fuel body 12 from the coolant which flows over the exterior surface of the fuel element 10 to transfer heat away therefrom, thereby protecting the fuel from reaction with or contamination from the coolant. The cladding also seals in fission products and precludes their escape into the coolant.

The fuel body 12 is designed in configurational dimensions for radial expansion of about 25 to 30 vol. % due primarily to internally generated, fission-produced gases. Thus, the initially produced metal fuel units are of substantially smaller cross-sectional area than the internal cross-sectional area within the fuel cladding 14. As a result, an intermediate space 16 is formed between the exterior surface of the fuel body 12 and the interior surface of the fuel cladding 14. This initial intermediate space 16 is designed to accommodate the expansion of the fuel body 12 attributable to the gases produced during service and to protect the fuel cladding 14 from physical stress and possible rupture which would otherwise arise due to internal pressure of a confined body of expanding fuel.

The intermediate space 16 of the fuel element 10 is initially filled during the fuel fabrication process with a liquid metal bonding material such as sodium, potassium, lithium or their alloys in solid form, which becomes molten at normal reactor operating temperatures and is displaced by the fuel as it expands. The bonding material enhances heat transfer from the fuel outward to the cladding while the fuel is expanding to fill the intermediate space.

The fuel units of a typical fuel element for service in a liquid metal-cooled nuclear reactor are cylindrical bodies having a diameter of approximately 0.19 inch. The stainless steel cladding which surrounds such fuel units has a wall thickness of about 20 mils and an outside diameter of about 0.26 inch.

The barrier in accordance with the invention is a multi-layer expandable body 18 of expendable alloying metal which is positioned between the fuel unit and fuel cladding. As a result, the metal alloy fuel interacts with the barrier material, not the stainless steel of the cladding. The barrier may be composed of any alloying metal having the property of increasing the melting temperature of metallic fuels, such as zirconium, titanium, niobium, molybdenum, vanadium, chromium and the like. Zirconium is a preferred alloying metal for the practice of the invention.

Figure 2:
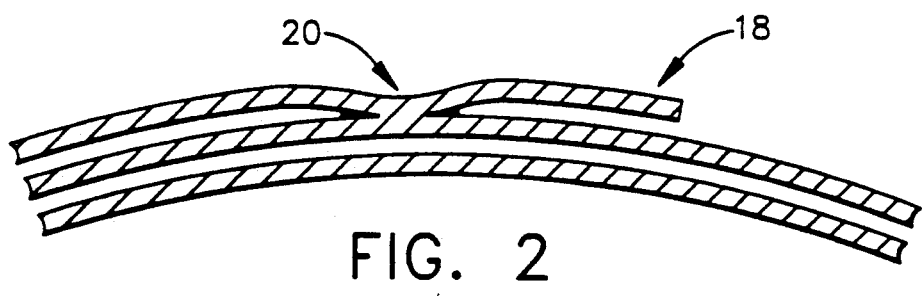
FIG. 2 is a cross-sectional view of the laser tack-welded portion of a three-layer fuel/cladding barrier in accordance with a preferred embodiment of the invention.

In accordance with the preferred embodiment of the invention, the barrier is a multi-layer rolled foil 18 of zirconium or functionally equivalent metal. As best seen in FIG. 2, metal foil is rolled into the shape of a multi-layer tube and then laser tack-welded to hold the foil in the rolled state. The laser welding penetration is adjusted so that a foil weld 20 fuses only two or more of the outermost layers. At the weld point, the rolled foil must comprise at least one more layer than the number of foil layers penetrated by the laser weld.

Figure 3:
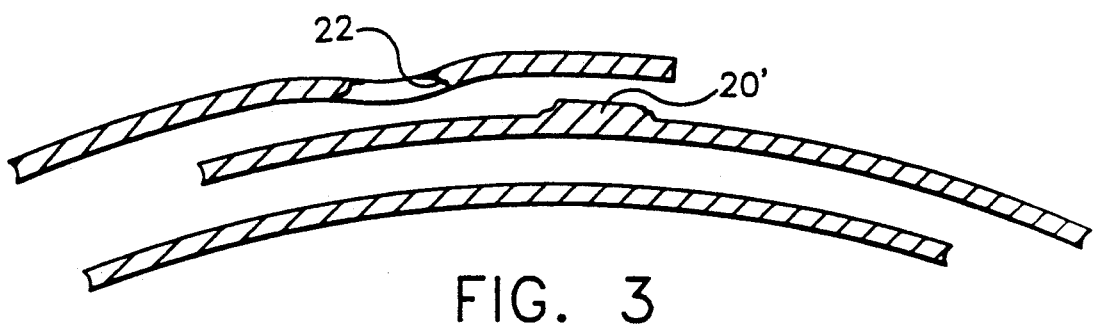
FIG. 3 is a cross-sectional view of the previously laser tack-welded portion of the three-layer fuel/cladding barrier of FIG. 2 after failure of the weld.

The weld 20 is designed to fail in response to fuel or blanket alloy swelling during irradiation. The fused material holding the outermost and one or more of the middle layers together fails at a level of stress which is less than the level of stress at which the material of said foil would rupture. After weld failure, the overlapping layers slip and the multi-layer foil unrolls, as shown in FIG. 3. For the purpose of illustration, FIG. 3 shows a failed weld area 22 in the outermost layer circumferentially shifted relative to a weld residue 20' still fused on the middle layer. (Obviously the positions of the failed weld area and the weld residue could be reversed.) If the barrier were comprised of only two layers at the point of tack welding, the relative movement of the two foil layers could give rise to a direct "line of sight" for radiation through the failed weld area 22 if the latter cleared the edge of the second layer. However, in accordance with the invention, a third foil layer is provided to assure that a barrier of at least two foil layers is presented along every "line of sight" from the fuel body 12 to the cladding 14. Thus, unrolling of the foil masks defects in the individual foil layers arising from small undetected manufacturing defects or weld failures, thereby providing a barrier which accommodates swelling associated with the metal fuel and blanket alloys.

In the initial step, the tube is formed with at least $2\frac{1}{2}$ turns of the foil and then tack-welded. Laser weld development with 0.002-inch-thick pieces of zirconium foil revealed that the weld power could be adjusted so the weld penetrates the outer layers of foil in a stack without affecting the innermost layer. The geometric arrangement of cladding and barrier must satisfy the following relationship to assure that the foil movement masks the weld defects with one less foil layer than is initially provided at the weld point:

$$(C-2T-B)\pi+3S<L$$

where C is the cladding diameter; T is the cladding thickness; B is the barrier diameter; S is the tack weld diameter; and L is the inside foil lap past the weld area. This expression assures that the inside foil layer laps the weld area enough that the failed weld areas in the unrolled or slipped foil barrier will not provide a direct "line of sight" between the cladding and fuel or blanket alloy.

The preferred embodiment shown in FIG. 1 has been disclosed for the purpose of illustration only. It will be readily appreciated that the invention is not limited to a rolled foil barrier having only three foil layers at the point of tack welding. The barrier may have more than three foil layers at the point of tack welding provided that at least two but less than all of the foil layers are fused together by tack welding from the outermost side.

We claim:

1. In a fuel element for a nuclear reactor comprising an elongated body a metal alloy fissionable fuel housed within a sealed elongated cladding, said body of fuel having a smaller cross-sectional area than the cross-sectional of the internal space of said thereby providing an intermediate said body of fuel and said cladding, and a barrier of material arranged in said intermediate space to circumferentially surround said body of fuel, the improvement wherein said barrier comprises a multi-layer rolled foil held in a tubular shape by tack welding and having a section with an innermost layer, an outermost layer and an intermediate layer, said innermost layer lying between said body of fuel and said intermediate layer, said intermediate layer lying between said innermost and said outermost layers, and said outermost layer lying between said intermediate layer and said cladding, said outermost layer and said intermediate layer being tack welded to each other at points on said outermost layer which are removed from an outer longitudinal edge of said foil.

2. The fuel element as defined in claim 1, wherein said foil comprises metal.

3. The fuel element as defined in claim 1, wherein said foil comprises metal alloy.

4. The fuel element as defined in claim 2, wherein said metal is selected from the group consisting of zirconium, titanium, niobium, vanadium, chromium and molybdenum.

5. The fuel element as defined in claim 2, wherein said fuel comprises metallic uranium and plutonium and their alloys with elements taken from the group consisting of zirconium, titanium, niobium, vanadium, chromium and molybdenum, said cladding comprises stainless steel, and said metal is selected from the group consisting of zirconium, titanium, niobium, vanadium, chromium and molybdenum.

6. The fuel element as defined in claim 1, wherein said rolled foil has at least three layers at the point of tack welding and at least said outermost and said intermediate layers, but less than all of said layers are fused together by said tack welding from the outermost side.

7. The fuel element as defined in claim 6, wherein said fused material holding said outermost and said intermediate layers together fails at a level of stress due to expansion of said fuel body which is less than the level of stress at which the material of said foil would rupture.

8. The fuel element as defined in claim 1, wherein the geometric arrangement of said cladding and said barrier satisfies the relationship:

$$(C-2T-B)\pi+3S<L$$

where C is the cladding diameter; T is the cladding thickness; B is the barrier diameter; S is the tack weld diameter; and L is the inside foil lap past the weld area.

9. A fuel/cladding barrier comprising a multi-layer rolled foil held in a tubular shape by tack welding and having a section with an innermost layer, an outermost layer and an intermediate layer, said intermediate layer lying between said innermost and said outermost layers, and said outermost layer and said intermediate layer being tack welded to each other at points on said outermost layer which are removed from an outer longitudinal edge of said foil.

10. The fuel/cladding barrier as defined in claim 9, wherein said foil comprises metal.

11. The fuel/cladding barrier as defined in claim 9, wherein said foil comprises metal alloy.

12. The fuel/cladding barrier as defined in claim 10, wherein said metal is selected from the group consisting of zirconium, titanium, niobium, vanadium, chromium and molybdenum.

13. The fuel/cladding barrier as defined in claim 9, wherein said rolled foil has at least three layers at the point or tack welding and at least two but less than all of said layers are fused together by said tack welding from the outermost side.

14. The fuel/cladding barrier as defined in claim 13, wherein said fused material holding said outermost and said intermediate layers together fails at a level of radial stress which is less than the level of radial stress at which the material of said foil would rupture.

15. A method of installing a barrier between an elongated body of a metal alloy fissionable fuel and the material of a sealed elongated container in which said fuel body is housed to inhibit an interaction whereby low-melting-point eutectic reaction products of components form the metal alloy fuel and container material are formed, said body of fuel having a smaller cross-sectional area than the cross-sectional of the internal space of said container, thereby providing an intermediate space between said body of fuel and said container, comprising the steps of:

rolling foil into a multi-layer tubular configuration having a section with an innermost layer, an outermost layer and an intermediate layer, said intermediate layer lying between said innermost and said outermost layers;

tack welding to hold said foil in said tubular configuration, said outermost layer and said intermediate layer being tack welded to each other at points on said outermost layer which are removed from an outer longitudinal edge of said foil; and installing said multi-layer rolled foil in said intermediate space so that said innermost layer circumferentially surrounds said body of fuel.

16. The method as defined in claim 15, wherein said foil comprises a metal selected from the group consisting of zirconium, titanium, niobium, vanadium, chromium and molybdenum.

17. The method as defined in claim 16, wherein said fuel comprises metallic uranium and plutonium and their alloys with elements taken from the group consisting of zirconium, titanium, niobium, vanadium, chromium and molybdenum, and said container comprises stainless steel.

18. The method as defined in claim 15, wherein said rolled foil has at least three layers at the point of tack welding and at least said outermost and said intermediate layers, but less than all of said layers are fused together by said tack welding from the outermost side.

19. The method as defined in claim 18, wherein said fused material holding said outermost and said intermediate layers together fails at a level of stress due to expansion of said fuel body which is less than the level of stress at which the material of said foil would rupture.

20. The method as defined in claim 15, wherein the geometric arrangement of said container and said barrier satisfies the following relationship:

$$(C-2T-B)\pi + 3S < L$$

where C is the container diameter; T is the container thickness; B is the barrier diameter; S is the tack weld diameter; and L is the inside foil lap past the weld area.

* * * * *